US 6,724,722 B1

United States Patent
Wang et al.

(10) Patent No.: US 6,724,722 B1
(45) Date of Patent: Apr. 20, 2004

(54) MANAGING CONGESTION AND POTENTIAL TRAFFIC GROWTH IN AN INFORMATION NETWORK

(75) Inventors: Yufei Wang, Holmdel, NJ (US); Zheng Wang, Holmdel, NJ (US); Leah Zhang, San Diego, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/520,247

(22) Filed: Mar. 7, 2000

Related U.S. Application Data

(60) Provisional application No. 60/125,603, filed on Mar. 19, 1999.

(51) Int. Cl.[7] .............................................. H04C 12/56
(52) U.S. Cl. ....................................... 370/229; 370/237
(58) Field of Search ................................. 370/229, 230, 370/230.1, 232, 235, 386, 237, 238

(56) References Cited

U.S. PATENT DOCUMENTS 5,953,338 A * 9/1999 Ma et al. ..................... 370/395
6,202,094 B1 * 3/2001 Grosser, Jr. et al. ........ 709/226

OTHER PUBLICATIONS

R. Guerin, et al, QoS–based Routing in Networks with Inaccurate Information: Theory & Algorithms, Infocom'97 (1997).
A. Wang, et al, Quality of Service Routing for Supporting Multimedia Applications, IEEE JSAC (Sep. 1996).

* cited by examiner

Primary Examiner—Kenneth Vanderpuye

(57) ABSTRACT

Traffic demands are routed across links of an information network so as to avoid congestion and allow for future traffic growth. Traffic demands from a source node to a destination node of the network are monitored, including bandwidths associated with each of the demands. For each demand, and for a given link of the network, that portion of the bandwidth associated with each traffic demand which is provided by the given link, is determined. A maximum value of link utilization among all links of the network is then determined, wherein link utilization is defined as the amount of bandwidth used by all traffic demands routed through a given link with respect to a total capacity of the link. Traffic demands are then routed across the links of the network in such a manner as to minimize the maximum value of link utilization.

26 Claims, 5 Drawing Sheets

THE "FISH PROBLEM"

SIMULATION TOPOLOGY

TABLE 1: CHARACTERISTICS OF THE TEST SETS

| TEST SET | NO. OF DEMANDS | TOTAL DEMANDS | TOTAL CAPACITY |
|---|---|---|---|
| 1 | 300 | 1801 | 172632 |
| 2 | 400 | 2410 | 172632 |
| 3 | 500 | 2996 | 172632 |
| 4 | 600 | 3659 | 172632 |
| 5 | 700 | 4126 | 172632 |
| 6 | 800 | 4965 | 172632 |
| 7 | 900 | 5466 | 172632 |
| 8 | 1000 | 5940 | 172632 |
| 9 | 1100 | 6617 | 172632 |
| 10 | 1200 | 7211 | 172632 |

MIN-HOP ALGORITHM VS. OTHERS

ONLINE ALGORITHMS EXCEPT MIN HOP

MANAGING CONGESTION AND POTENTIAL TRAFFIC GROWTH IN AN INFORMATION NETWORK

CROSS REFERENCE TO RELATED APPLICATION

This application claims the priority of U.S. Provisional Application No. 60/125,603 filed Mar. 19, 1999, and entitled "Internet Traffic Engineering: Theory and Algorithms".

BACKGROUND OF THE INVENTION

1. Field of the Invention

This invention relates to schemes for managing traffic flow in an information network.

2. Discussion of the Known Art

Recently, network traffic management has become an important subject. For example, dramatic increases in backbone network speeds require precise control over internal network traffic distribution. Yet, Internet Protocol (IP) traffic routing is based typically only on a destination address, and on simple metrics such as hop-count or delay. See C. Huitema, Routing in the Internet, Prentice Hall (1995). Although the simplicity of this routing approach is scalable to very large networks, use of resources within Internet backbone networks currently tends not to be optimal. A destination-based, shortest-path routing approach often results in uneven traffic distribution and, sometimes, in route oscillations.

Recent developments, such as Differentiated Services, Multi-Protocol Label Switching (MPLS), and Virtual Private Networks (VPNs), necessitate greater traffic engineering capabilities in Internet backbones. Under the differentiated services model, data packets are policed on a network edge, and forwarded based on only a DS field within the core. See S. Blake, et al., An Architecture for Differentiated Services, RFC-2475, IETF (December 1998). This approach relies heavily on effective traffic management to provide such resource allocations as needed to meet an existing service level agreement (SLA). Users are now considering IP VPNs for interconnection between different intranet user sites, and traffic must be handled to meet performance guarantees for virtual leased lines.

Multi-Protocol Label Switching (MPLS), recently developed by the Internet Engineering Task Force (IETF), provides essential capabilities for explicit routing in the Internet. See A. Viswanathan, et al., Evolution of Multiprotocol Label Switching, IEEE Communications, May 1998, all relevant portions of which are incorporated by reference. MPLS label distribution protocols can be used to set up explicit routes that differ from those provided by typical destination-based routing procedures. An originator of an explicit route can compute, based on optimization objectives, some or all nodes that will form the explicit route. Within an IP layer in a network, a MPLS explicit route is simply a point-to-point logical connection. Any packets sent onto a MPLS explicit route will travel to the other end of the route. Forwarding of packets over an explicit route is based on the MPLS labels, thus requiring no IP layer processing.

There are currently two protocols in MPLS for establishing label-switched paths (LSPs), and both of them support explicit routes. In addition, the MPLS label distribution protocols also permit Quality of Service (QoS) attributes to be specified. Thus, MPLS label distribution protocols can be used to set up a virtual private network (VPN) with explicit routes and bandwidth guarantees.

Although the MPLS explicit route approach has great flexibility, it requires a full-mesh logical network to be established between all edge nodes. While this is feasible for most reasonable size backbone networks, management complexity and messaging overheads can rise substantially when the number of edge nodes increases.

Topological routing problems have been considered along with assignments of link capacity (network sizing) for optimization of network resources. See T. Ng, et al., Joint Optimization of Capacity and Flow Assignment, IEEE Transactions on Communications, COM-35:202–209 (1987); M. Gerla, et al., Topology Design & Bandwidth Allocation in ATM Networks, IEEE Journal on Selected Areas in Communication, 7:1253–1262 (1989); and M. Lee, et al., A Logical Topology & Discrete Capacity Assignment Algorithm, Operations Research, 43:102–116 (1995).

A conventional approach is to choose average packet delay as a minimization objective, which results in a non-linear objective function under some queuing assumptions. The optimization problem is then formulated as a nonlinear multi-commodity network flow problem. See D. Bertsekas, et al., Data Networks, Prentice Hall (1987). Because of the nonlinear objective function, the optimization problem becomes very difficult to solve. Many heuristic approaches have been proposed, such as a flow deviation method and a proximal decomposition method. See L. Fratta, et al., The Flow Deviation Method, Networks, 3:97–133 (1973); and J. Chiffet, et al., Proximal Decomposition for Multicommodity Flow Problems, Telecommunications Systems, 3:1–10 (1994).

A rerouting heuristic algorithm is proposed in L. Benmohamed, et al., Designing IP Networks, Bell Labs Technical Journal (December 1998) for a classical network loading problem (linear objective function) with cost minimization in the context of IP networks, which explicitly considers restrictions imposed by the known Open Shortest Path First (OSPF) routing protocol. Another related area is Quality of Service (QoS) routing. Schemes have been proposed to find a path under multiple constraints. See Z. Wang, et al., Quality of Service Routing For Supporting Multimedia Communications, IEEE JSAC (September 1996); Q. Ma, et al., Routing Traffic with QoS Guarantees, NOSSDAV'98 (UK 1998); and R. Guerin, et al., QoS based routing in networks, Infocom'97 (1997). The proposed QoS routing schemes are typically "greedy", however, in that they try to find a path that meets a particular request without considering potential network-wide impacts.

Because of the commercial and competitive nature of Internet services, ISPs must always improve the perceived quality of network services by reducing delay and packet losses, and by increasing throughput experienced by end users. ISPs must meet their performance objectives and, at the same time, maintain a high level of resource utilization to maximize return of their investment in network assets.

SUMMARY OF THE INVENTION

According to the invention, a method of managing traffic flow across links of an information network includes monitoring traffic demands from a source node of an information network to a destination node of the network, including bandwidths associated with each of the traffic demands, and determining, for each traffic demand, and for a given link of the network, that portion of the bandwidth associated with each traffic demand which portion is provided by the given link. A maximum value of link utilization among all links of the network is determined, wherein link utilization is defined as the amount of bandwidth used by all traffic demands routed through a given link with respect to a total capacity of the link. The traffic demands are routed across the links of the network in such a manner as to minimize the maximum value of link utilization.

For a better understanding of the invention, reference is made to the following description taken in conjunction with he accompanying drawing and the appended claims.

DETAILED DESCRIPTION OF THE INVENTION

One approach toward optimizing network performance is to manage the use of bandwidth by routing the traffic over selected links in the network. Poor resource utilization in current networks may be illustrated by a so-called "fish problem". See FIG. 1.

Figure 1:
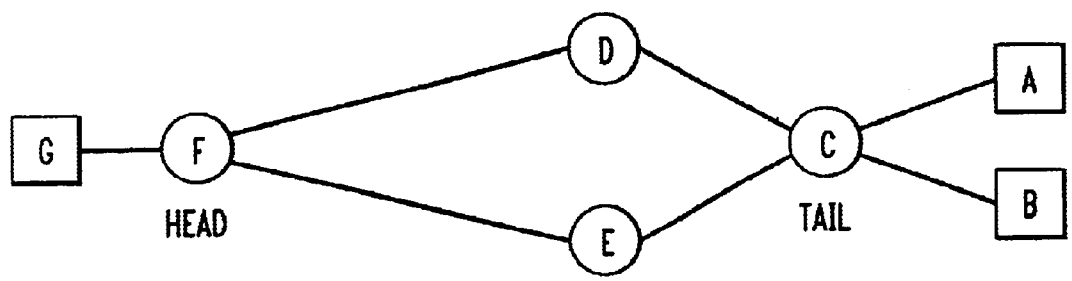
FIG. 1 is a graph of a network showing two sets of links within the network that form a path between a source and a destination node of the network.

The topology in FIG. 1 bears some resemblance to a fish, where G is the head, and A and B form the tail. Although there are two paths from the tail to the head (path C-D-F, and path C-E-F), all traffic from A and B to G is routed over only one of the two paths. This typically leads to extremely unbalanced traffic distribution; one path may be heavily loaded while the other remains idle.

The fish problem is caused primarily by two properties of current Internet routing protocols. First, the current protocols use destination-based shortest paths with simple link metrics. For a given destination, usually only one path meets the given criteria. Therefore, the protocols are not able to route traffic so as to balance loads over multiple paths to the same destination. Second, even if equal-cost multiple paths are available, the current routing protocols do not take full advantage of them because the protocols perform only a local optimization for a current demand, without considering possible impact on resource contention with other (future) demands.

Although network congestion can be reflected by periodical link state updates, it is known that local optimization based on periodical link state changes may lead to route oscillation. Using the topology in FIG. 1 as an example, assume a routing protocol initially selects C-D-F as a shortest path from C to F. As all traffic is routed over this path, it becomes heavily congested while the other path C-E-F is idle. At the next routing update, the routing protocol decides that path C-E-F is better, and selects it as a current-shortest-path from C to F. But all existing traffic is now moved from path C-D-F to path C-E-F, so path C-E-F becomes congested while at the same time path C-D-F becomes idle. The path selection is reversed in the next routing update, and the process goes on indefinitely.

The fish problem thus becomes one of route optimization. That is, given a network topology, link bandwidths, and point to point traffic demands between all edge nodes of a network, how should each newly arriving demand be routed across the network such that no one link capacity is exceeded and a pre-defined objective is optimized.

Typically, two factors contribute to network congestion. First, congestion may simply result from inadequate network resources. Traffic demands simply far exceed those which the network can accommodate; i.e., all network resources are highly utilized. Second, poor traffic distribution may also cause congestion at some parts of the network. If traffic is distributed in an unbalanced manner across the network, some links in the network may be overloaded while other links remain underutilized.

The problem of inadequate network resources may be addressed either with better network provisioning, or by reducing and controlling demands. Poor traffic distribution, however, may be addressed by the approaches or procedures described below. From a perspective of performance optimization, it is desirable to ensure that subsets of network resources do not become over utilized and congested, while other subsets along alternate, feasible paths remain underutilized. Ideally, all network links should be utilized to the same level. Because queuing delay increases non-linearly and at a faster rate as link utilization increases, a worst-case delay bound tends to increase when traffic distribution is unbalanced. As mentioned earlier, ISPs must keep maximum link utilization as low as possible.

Minimizing the maximum of link utilization will ensure that traffic is directed away from congested "hot spots" to less utilized parts of a network. This approach also leaves more room for future traffic growth than the other schemes noted above, and the percentage of residual bandwidth on links (unused bandwidth) is also maximized. Thus, future traffic growth is more likely to be accommodated. This is especially true assuming that network traffic grows in proportion to a current traffic pattern (i.e., scale up).

Problem Formulation

A backbone network is modeled as a set of nodes connected by links, each link having a fixed capacity (bandwidth). Edge, nodes are those that connect to customers' networks and to other backbones. Assume that the average traffic demand from one edge node to another is known. This demand can be measured by ISPs, or in the case of VPNs, specified by customers as the bandwidth requirement for two nodes. The physical network is represented as a directed graph. The links in the network and their capacities are directional, i.e., link (i,j) is considered different from link (j,i), each with its own capacity. Traffic demand between two edge nodes is also directional, i.e., the demand from node s to node t is different than that from node t to node s.

The problem to be solved is to route traffic demands between edge nodes over a physical network topology such that all the traffic demands are fulfilled, no physical link capacity is exceeded, and the maximum of link utilization is minimized. Let a graph $G=(V,E)$ represent the physical network, where V is the set of nodes and E is the set of links. For each link $(i,j) \in E$, let $c_{ij}$ be the capacity of the link. Let K be the set of traffic demands between a pair of edge nodes. For each $k \in K$, let $d_k$, $s_k$, $t_k$ be the bandwidth demand, the source node, and the destination node, respectively. Also, for each link $(i,j) \in E$, and for each demand $k \in K$, let $X^k_{ij}$ represent the percentage of k's bandwidth demand provided by link $(i,j)$. Let $\alpha$ represent the maximum of link utilization across all the links. A linear programing formulation for the optimization problem may then be given as follows:

Linear Programming Formulation (LPF)

$$\min \alpha \quad (1)$$

$$s.t. \ \Sigma_{j:(i,j)\in E} X_{ij}^k - \Sigma_{j:(j,i)\in E} X_{ji}^k = 0, \ k\in K, i\neq s_k, i\neq t_k \quad (2)$$

$$\Sigma_{j:(i,j)\in E} X_{ij}^k - \Sigma_{j:(j,i)\in E} X_{ji}^k = 1, k\in K, i=s_k \quad (3)$$

$$\Sigma_{k\in K} d_k X_{ij}^k \leq c_{ij} \alpha, (i,j)\in E \quad (4)$$

$$0 \leq X_{ij}^k \leq 1, \alpha \geq 0$$

The objective function (1) defines the variable to be minimized as the maximum of link utilization. Constraints (2) and (3) are flow conservation constraints. Equation (2) maintains that traffic flowing into a node must equal the traffic flowing out of the node, for any node other than a source node and a destination node for a given demand. Equation (3) defines the net flow out of a source node as 1, which is the total required bandwidth after being scaled by $d_k$. Constraint (4) is a link capacity utilization constraint. It maintains that the total amount of bandwidth consumed by all logical connections on a link, should not exceed the maximum utilization rate times the total capacity of the link. The last constraint restricts all the variables to non-negative real numbers, and the $X^k_{ij}$ variables to be no more than 1.

The above LPF can be solved by standard packages (e.g., CPLEX), and the resulting solution produces optimal routes for all demands. As shown below, the LPF results can be implemented both with MPLS-based and OSPF-based approaches.

A demand between two edge nodes may be split over multiple routes. Suppose in FIG. 1 that the demand between node A and node G is x. An optimal routing solution produced by the above LPF may require two routes to be set up for the demands (A-C-E-F-G and A-C-D-F-G), and the demand x to be split over the two routes at a certain ratio (e.g., 2:3). This requires edge nodes such as node C in FIG. 1 to be able to perform load sharing over multiple paths. For offline routing, assume that load sharing is feasible because time constraints are not important, and the fact that point-to-point demands are in the form of aggregated traffic flows or statistical averages. For online routing, however, it may be difficult to split individual demands optimally on a dynamic basis, so it is assumed that placing each demand over a single route is better from an operational perspective.

Assuming all demands are known, a mathematical formulation for the case where each demand must be routed over a single path may take the form of the above LPF, with an additional restriction that the $X^k_{ij}$ variables must be either 0 or 1. The optimization problem then becomes an integer programming one, and it is known to be NP-hard. The LPF solution will provide a lower bound to any online routing procedure that is used to optimize traffic routing within a network.

MPLS-Based Approach

A MPLS explicit route is simply a point-to-point logical connection from the perspective of an IP layer; any packets sent onto a MPLS explicit route will follow through to the other end. Thus, once the LPF produces optimal routes for all demands, available techniques can be used to set up corresponding MPLS-explicit routes within a network.

The setup can operate in either of two modes. First, in an offline mode, the routes for all demands are updated at a scheduled time, e.g., nightly. In this case, the demands and topological information can be used as inputs to a traffic management system, and the routes calculated by solving the LPF. The results are then used to set up explicit routes for the demands. If a demand must be split over multiple routes, the edge node that originates the explicit route must be configured to perform load sharing over the multiple routes.

A potential problem with this approach is that each scheduled update may disrupt all previously established routes, and frequent updating may generate unacceptable messaging overheads. Thus, the offline mode should be invoked over relatively long time intervals, rather than on a per-call basis.

The second operating mode is an on-line mode. If demands are added and are deleted frequently, an incremental approach is more desirable. For example, when a demand is created as a result of a new VPN being added to a network, new explicit routes are established for these demands, and all previously routed logical connections will remain unchanged. This approach will therefore minimize potential impacts on the operation of a given network.

Figure 6:
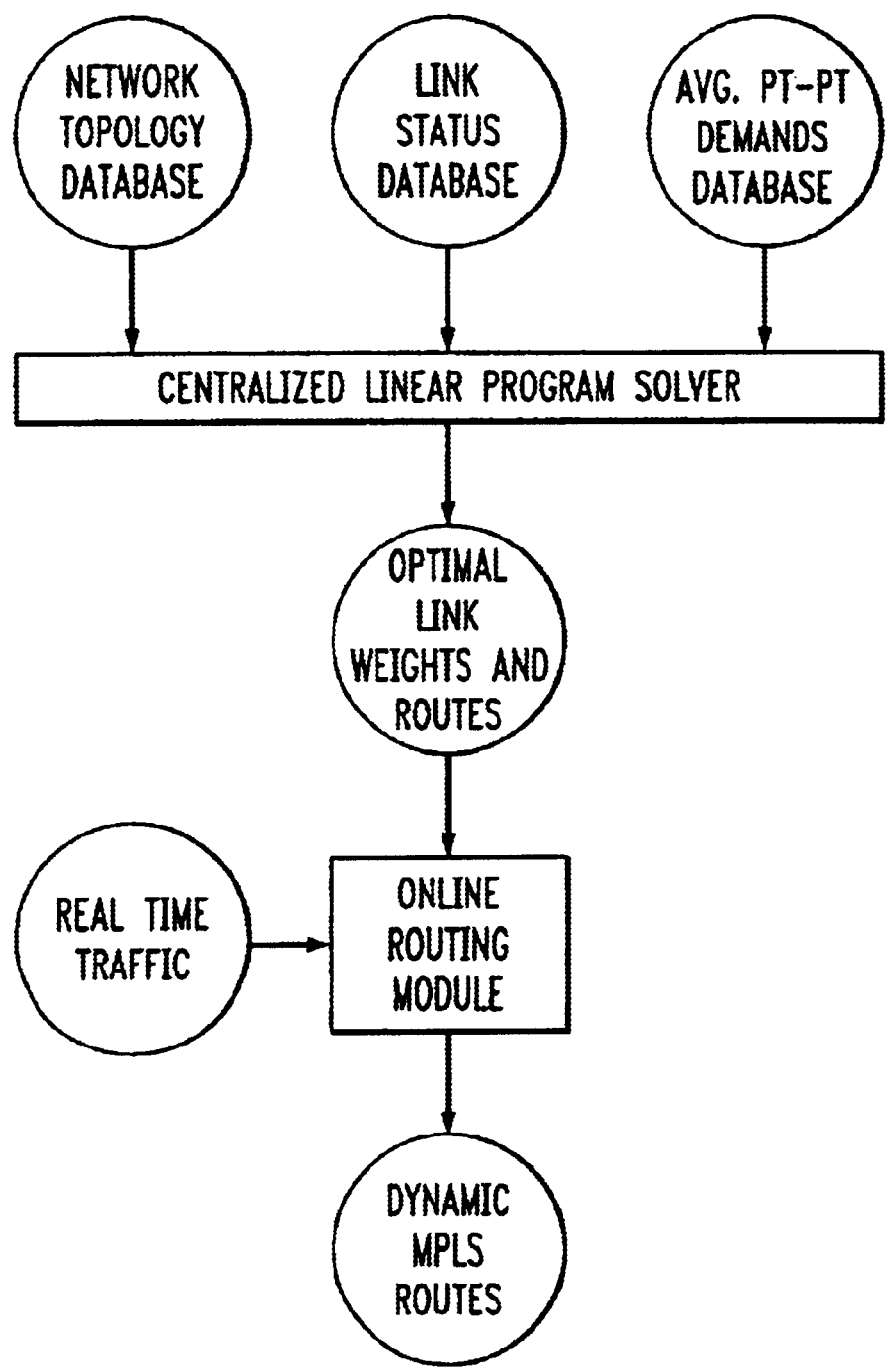
FIG. 6 is a flow chart illustrating network traffic routing according to the invention.

Five heuristic, on-line routing procedures that can be used for the incremental approach, are now presented. These schemes do not assume knowledge about an entire demand set, and they ensure that demands are not split over multiple routes. Performance of these schemes relative to an optimal solution by the LPF, is examined later below. FIG. 6 illustrates dynamic network traffic routing according to the invention.

Assume that a given network topology, its link capacities, and all explicit routes that have been previously placed, are known. No knowledge about future demands is assumed, however. All of the procedures, except minimum hops (MH) are sensitive to link state. Link state can be measured either by residual capacity, or by link utilization (the ratio of used capacity to total capacity). Link utilization is a better indicator than absolute residual capacity for traffic delay. In addition, it offers better optimization performance. Numerical experiments performed show that link state sensitive procedures that use link utilization as a metric, perform significantly better than procedures which use absolute residual capacity values and are link state insensitive. Therefore, except for minimum hop, all the following procedures use link utilization-based metrics.

1. Shortest Path (SP) and Minimum Hops (MH)

Although shortest-path routing procedures are generally known and used over the Internet, it is important to distinguish the present shortest path routing approach in the context of the current network optimization objective, i.e., minimizing the maximum of link utilization. The cost metric used for demand k for link (i,j) is calculated as $a^k_{ij} = (f^k_{ij} + d)/c_{ij}$ where $f^k_{ij}$ is current link load (excluding current demand k), d is the size of the current demand k, and $c_{ij}$ is the total capacity of the link. Explicit routes are then selected by choosing the path with the minimum cost.

A variation of shortest path routing is minimum hop routing. In this case, the link metric is set to 1 uniformly, and the shortest path procedure will always choose the path which has minimum hops.

2. Shortest-Widest Path (SWP)

With shortest-widest path routing, paths with the largest bottleneck bandwidth are selected, wherein the bottleneck bandwidth of a path is the minimum idle capacity across all the links on the path. If there are multiple candidate paths, the path with minimum hops or the shortest distance is chosen. Further details of such routing in a QoS context to support bandwidth reservation, may be found in Z. Wang, et al., Quality of Service routing for Supporting Multimedia Communications, IEEE JSAC (September 1996); Q. Ma, et al., Routing Traffic with Quality of Service Guarantees in Integrated Service Networks, NOSSDAV'98 (UK 1998); and R. Guerin, et al., QoS Based Routing in Networks with Inaccurate Information, INFOCOM '97 (1997), all relevant portions of which are incorporated by reference.

The present approach incorporates a variation of shortest-widest path routing wherein the percentage of link idle capacity, not the absolute amount of idle capacity, is used. That is, the path is computed such that the resulting maximum of link utilization of all the links on the path, is minimized. This variation performed best in tests that were performed, as described below.

3. Min-Max Link Utilization (MM)

A routing technique based on a link cost metric which closely resembles the optimization objective of the LPF, above, now follows. The technique keeps track of $\alpha$, the current maximal link utilization value, across all the links all the time. Before a current demand k is routed, let $\alpha^k$ be the global maximal link utilization, $\alpha^k_{ij}$ be the utilization of link (i,j), and $t^k_{ij} = d/c_{ij}$ be the incremental utilization of link (i,j) caused by demand k, i.e., $\alpha^k_{ij} = f^k_{ij}/c_{ij}$ and $\alpha^k = \max_{ij} \alpha^k_{ij}$. The notation here is the same as used above.

The cost metric for link (i,j) for demand k is defined as $a^k_{ij} = \max \alpha^k_{ij} + t^k_{ij} - \alpha^k, 0 + \epsilon t_{ij}$. The first term is the increase of the global $\alpha$ caused by link (i,j) if, after loading demand k, its utilization exceeds the current global $\alpha$, and 0 otherwise. The second term is a noice term for breaking ties where $\epsilon$ is a very small scalar. The only time the second term is significant is when multiple paths exist having an identical minimum impact on the global $\alpha$. In this case, the path with the total accumulated resource (utilization) consumption is chosen. A difference between this and the shortest-widest path procedure is that this procedure takes the shortest (utilization) path as long as network bottlenecks can be avoided, while the shortest widest path approach may end up with a longer path which is "widest".

4. Hybrid

The shortest path based procedures minimize total resource consumption per demand, as they select a minimal cost path. But the optimization is local in the sense that it does not consider other and future demands on the network. As an example, taking a longer path for a current demand may consume more bandwidth in the extra hops. But such a route would leave more residual bandwidth at critical bottleneck links in view of anticipated future demands.

The widest path and Min-max link utilization based approaches tend to avoid overloading any bottleneck links by taking longer paths. These extra hops, however, may not always be necessary given the fact that any pattern future demands may establish is unknown, and, theoretically, any scenario may occur.

By examining a tradeoff between avoiding bottleneck links and taking longer paths, a hybrid approach which balances the two objectives by assigning them appropriate weights, is now given. Using the same notation as above, define a link cost metric as $$a^k_{ij} = (\alpha^k_{ij} + t^k_{ij})t^k_{ij} + h^k \alpha^k \max \alpha^k_{ij} + t^k_{ij} - \alpha^k, 0$$

where $h^k$ is the number of hops of a min-hop path for demand k. The cost metric includes two terms. The first can be viewed as an enhanced version of the incremental link utilization metric used in the shortest path approach (SP). The difference is the extra multiplier $t^k_{ij}$ which can be interpreted to imply that if two links have the same utilization, the one with larger capacity is selected.

The second term is the impact to the global $\alpha$, which is the same metric used in the Min-max utilization procedure. Two multipliers are applied for the second term, viz., $h^k$ and $\alpha^k$. The reason is as follows. Longer paths (as measured by $h^k$) can be more affordable than shorter paths if extra hops along those paths are taken to avoid bottlenecks. The weight of the second term therefore increases with path length $h^k$. The second term should be less important initially when the network is relatively empty (no bottlenecks), and becomes more important as the network becomes loaded. $\alpha^k$ is such an indicator. Once the cost metric is defined for each link, the demand is routed along the shortest path based on this new link metric.

Open Shortest Path First (OSPF)-Based Approach

While the above MPLS-based approaches can be implemented relatively easily, they do incur an "N-square" problem. That is, to establish logical connections between N edge nodes, at least $N^2$ explicit routes are needed. And if demands are split over multiple routes, the number of explicit routes may be even larger. As the size of a backbone network increases, the number of explicit routes that need to be established will rise significantly, adding considerable management complexity and messaging overhead. For example, for a network with 20 PoPs wherein each PoP has 10 edge nodes, 40,000 explicit routes will need to be set up.

A desired traffic distribution may be achieved, however, by manipulating the link weights in OSPF. Optimal routes are obtained first by solving the above LPF, and then defining the link weights so that OSPF achieves the identical optimal traffic distribution by performing typical shortest path calculations. That is, by adjusting the link weights, optimal traffic routing which until now was thought possible only by using explicit routing protocols like MPLS, can be achieved.

This approach has a number of advantages. First, it can be readily implemented without requiring an upgrade of the network infrastructure. OSPF is currently widely deployed. And, once the link weights are set, then OSPF applies typical computations. Second, it eliminates the "n-square" problem altogether, thus reducing messaging overhead in setting up explicit routes. Finally, the approach can be implemented within. current IP datagram routing and forwarding protocols, so it retains the simplicity and scalability of IP routing. The approach requires equal-cost multi-path capability, which is supported by OSPF.

A method of calculating the link weights so that OSPF will produce a set of routes that achieve a desired traffic distribution, is now described. The approach makes use of the linear programming duality theory. See V. Chvatel, Linear Programming, W. K. Freeman & Co. (1983), all relevant portions of which are incorporated by reference. Each linear programming problem (P) is associated by another linear programming problem (D). (D) is called the dual problem of (P) and (P) itself is called the primal problem. (P) is in turn the dual of (D). (P) and (D) are mathematically equivalent in the sense that they have the same optimal objective value, and the optimal solution of (D) can be derived from the optimal solution of (P) and vice versa by the relationship of complementary slackness. The variables in (D) can be interpreted as the shadow prices for resource constraints in (P).

For demand k, let $s_k$ and $t_k$ be the source and the destination edge nodes, $\{U^k_i\}$ be the shortest distance from the source node $s_k$ to node i for each -node i, and $\{W_{ij}\}$ the weight for link (i,j). Then the dual of the LPF is given as follows:

Dual formulation (DPF)

$$\max \Sigma_{k \in K} d_k U_{t_k}^k \quad (6)$$

$$\text{s.t. } U_j^k - U_i^k \leq W_{ij}, k \in K, (i,j) \in E \quad (7)$$

$$\Sigma_{(i,j) \in E} c_{ij} W_{ij} = 1, \quad (8)$$

$$W_{ij} \geq 0, U_{s_k}^k = 0 \quad (9)$$

The DPF, above, may be solved to obtain an optimal link weight set $\{W_{ij}\}$. This set of link weights will make the optimal routes determined by (LPF) the shortest paths. Based on the optimal set of link weights, there may be multiple-equal cost shortest paths between the same edge node pair that are likely candidates for load balancing. Therefore, the primal problem (LPF) may then be solved to determine just how traffic should bib split, if at all, among multiple equal cost shortest paths as determined by the link weights $\{W_{ij}\}$.

EXAMPLE

Figure 2:
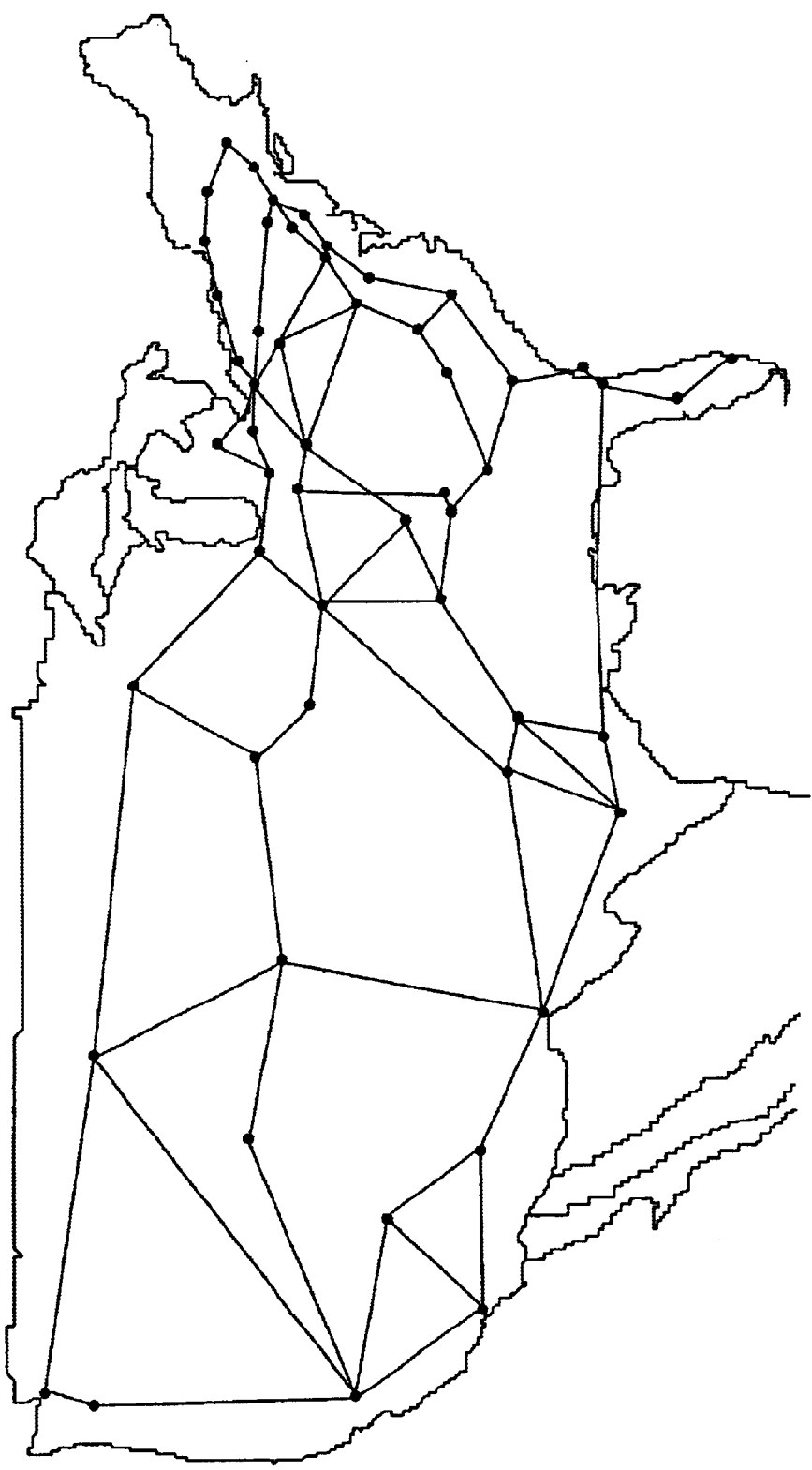
FIG. 2 is a representation of a backbone network.

To evaluate the performance of the present procedures in a realistic setting, a network topology similar to one of the largest Internet backbones in the United States was used. The network has 54 nodes and 174 directional links, as represented in FIG. 2.

For the given network topology, the link capacities are generated as random numbers with a uniform integer distribution in [600, 1400]. Ten test sets were constructed, with the number of demands varying from 300 to 1200 in increments of 100. The size of each individual demand is generated by a random variable with a uniform integer distribution in [1, 10]. The source and the destination pairs are also selected randomly among all edge nodes, although all duplicate pairs are removed.

All quantities are specified in a common bandwidth unit (such as DS1). The exact value of the bandwidth unit and the overall size of the total link capacities vs. total bandwidth demand do not affect the results; i.e., the problem formulation uses link utilization as an objective which operates as a scalar. The number of demands, the total bandwidth of all demands, and the total bandwidth of all link capacities in the network, are summarized in the table of FIG. 3.

The maximum of link utilization $\alpha$ should not be larger than 1 if all demands are routable. In the tests performed, however, $\alpha$ may be larger than 1. This indicates that the network does not have sufficient bandwidth to meet all bandwidth demands. In fact, $\alpha$ represents precisely a level of over-booking at the bottlenecks. To lower the maximum of link utilization to 1, either the bottleneck link capacities are scaled up by a factor of $\alpha$, or the bottleneck demands are scaled down by a factor of $\alpha$.

All computations were carried out on a SUN SPARC 10 workstation. Optimal LPF solutions were first obtained for all 10 test sets by solving them as centralized linear programming problems. First, the solutions are the optimal solutions for offline routing problems. Second, they provide lower bounds for online routing procedures. The computations took no more than a few minutes for all cases.

The computations were then simulated for the five online routing procedures using the same configuration. The only difference being that an order of routing the demands must be predetermined. Random sequencing was used. Another assumption was that initially the network was empty. If there is existing traffic in the network before an online routing procedure starts, it is mathematically equivalent to using only the residual (idle) link capacity and viewing the network as being empty.

Figures 3, 4:
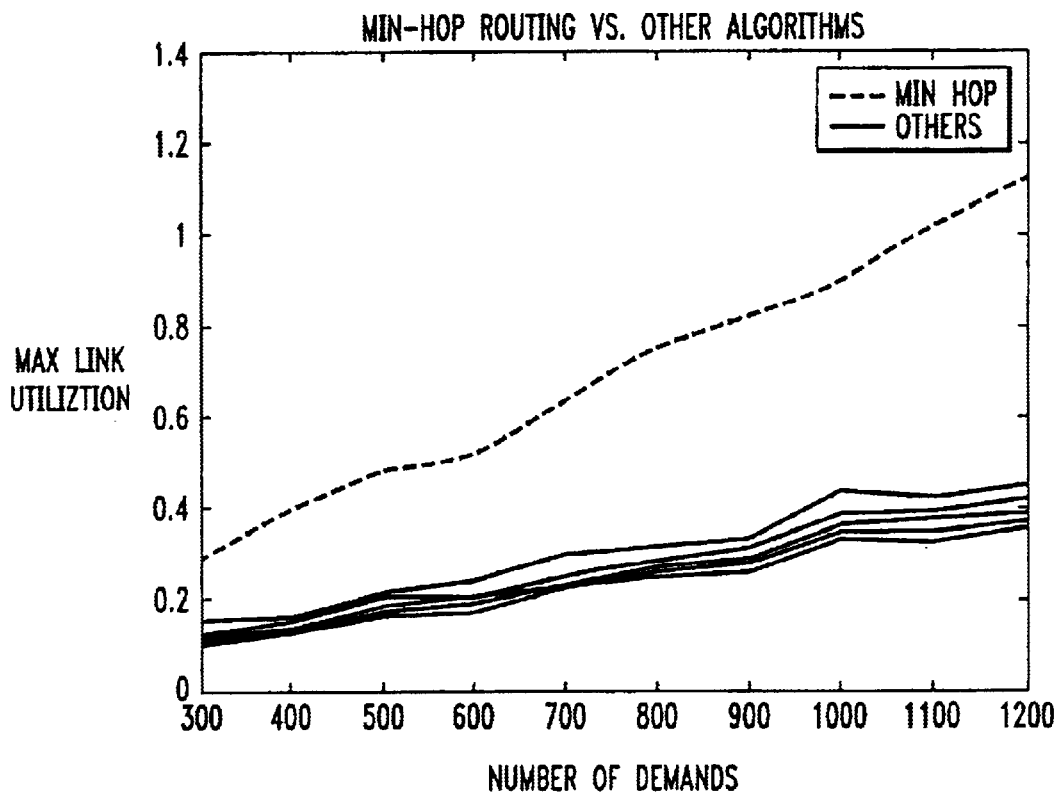
FIG. 3 is a table of results for tests performed on a simulated network according to FIG. 2.
FIG. 4 is a graph which compares results obtained using traffic routing approaches according to the invention.
Figure 5:
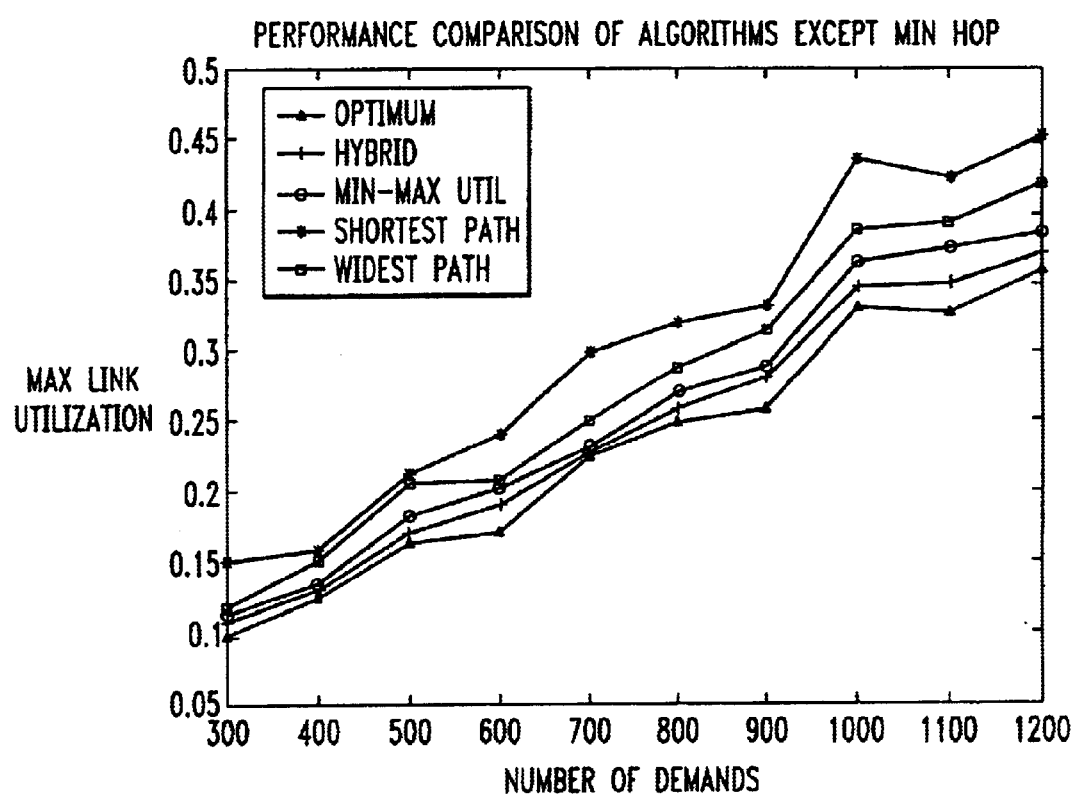
FIG. 5 is a graph showing results obtained using online traffic routing techniques according to the invention.

FIGS. 4 and 5 are plots of performance curves of the five online routing procedures, as well as the optimal solution of the offline LPF formulation. Here, performance is measured by ultimate maximum link utilization across the entire network as a result of routing by each procedure. FIG. 4 shows a significant difference between the min-hop procedure and the others. FIG. 5 compares the performance of all other procedures.

The following observations are made from the test results.

First, the min-hop approach is the only link state insensitive procedure among those evaluated, and it was outperformed greatly by the others.

Second, link utilization is a good indicator of link state, as procedures based on link utilization outperform those based on absolute values of residual capacities (the results are not shown in the drawing).

Third, among the four link utilization based approaches, the hybrid approach shows best performance, but differences between such approaches are not significant.

Fourth, the performance of the four link utilization based procedures matches very closely that of the optimal LPF solution. Note that the LPF solution is optimal for the case where demands can be split. The optimal value for the non-splitting case may in fact be higher than the LPF number. Thus, the LPF solution is merely a lower bound for the dynamic routing problem.

Fifth, the performance of the four link utilization based procedures as measured by the gap with the optimal LPF solution, does not degrade as the number of demands grows.

While the foregoing description represents preferred embodiments of the invention, it will be obvious to those skilled in the art that various changes and modifications may be made, without parting from the spirit and scope of the invention pointed out by the following claims.

We claim:

1. A method of managing traffic flow across links of an information network, comprising:

monitoring traffic demands from a source node of an information network to a destination node of the network, including bandwidths associated with each of the traffic demands;

determining for each traffic demand and for a given link of the network, that portion of the bandwidth associated with each traffic demand which portion is provided by the given link;

determining a maximum value of link utilization among all links of the network, where link utilization is defined as the amount of bandwidth used by all traffic demands routed trough a given link with respect to a total capacity of the link;

calculating a cost metric for each link of the network based on information comprising the traffic demand and maximum value of link utilization;

selecting a path that minimizes the maximum value of link utilization based on each cost metric; and routing the traffic demands across the path.

2. The method of claim 1, further comprising routing traffic demands over more than one path in the network.

3. The method of claim 1, further comprising routing each traffic demand over a single path in the network.

4. A method of managing traffic flow across links of an information network comprising:

receiving a demand to route network traffic;

determining a demand size of the demand;

determining a routing procedure associated with the demand;

calculating a cost metric for each of a plurality of links of a network; the cost metric for each link being associated with information comprising the routing procedure and a link utilization, the link utilization being a ratio of link capacities; and selecting a path to route network traffic based on the calculated cost metric for each of the plurality of links.

5. The method of claim 4 wherein, the network traffic is routed over a multi-protocol label switching network.

6. The method of claim 4 wherein, the routing procedure is a shortest path routing procedure and the cost metric is determined by a ratio of the used link capacity and the demand size to the total link capacity.

7. The method of claim 4 wherein, the routing procedure is a shortest-widest path routing procedure and the cost metric is associated with a percentage of link idle capacity.

8. The method of claim 7 wherein, if there are multiple candidate paths, the path with minimum hops or the shortest distance is chosen.

9. The method of claim 4 wherein, the routing procedure is a Min-Max link utilization routing procedure and the cost metric is associated with a maximum link utilization of the link, the demand size, and link utilization of the plurality of links.

10. The method of claim 9 wherein, the cost metric is adjusted by a small scalar value and the demand size where a cost metric for a link is the same as a cost metric for another link.

11. The method of claim 4 wherein, the routing procedure is a hybrid routing procedure and the cost metric is associated with the link utilization, the demand size, a maximum link utilization for the link, a number of hops of a minimum hop path for the demand, and the link utilization of the plurality of links.

12. The method of claim 11 wherein, the selected path to route network traffic is the shortest path.

13. The method of claim 4 wherein, selecting the path to route network traffic is based on a weight associated with the calculated cost metric for each of the plurality of links; each weight being manipulated in a open shortest path first network.

14. A computer readable medium including computing instructions for managing traffic flow across links of an information network, the instructions comprising:

monitoring traffic demands from a source node of an information network to a destination node of the network, including bandwidths associated with each of the traffic demands;

determining for each traffic demand and for a given link of the network, that portion of the bandwidth associated with each traffic demand which portion is provided by the given link;

determining a maximum value of link utilization among all links of the network, where link utilization is defined as the amount of bandwidth used by all traffic demands routed trough a given link with respect to a total capacity of the link;

calculating a cost metric for each link of the network based on information comprising the traffic demand and maximum value of link utilization;

selecting a path that minimizes the maximum value of link utilization based on each cost metric; and routing the traffic demands across the path.

15. The computer readable medium of claim 14, including instructions further comprising routing traffic demands over more than one path in the network.

16. The computer readable medium of claim 14, including instructions further comprising routing each traffic demand over a single path in the network.

17. A computer readable medium including computing instructions for managing traffic flow across links of an information network, the instructions comprising:

receiving a demand to route network traffic;

determining a demand size of the demand;

determining a routing procedure associated with the demand;

calculating a cost metric for each of a plurality of links of a network; the cost metric for each link being associated with information comprising the routing procedure and a link utilization, the link utilization being a ratio of link capacities; and selecting a path to route network traffic based on the calculated cost metric for each of the plurality of links.

18. The computer readable medium of claim 17 wherein, the network traffic is routed over a multi-protocol label switching network.

19. The computer readable medium of claim 17 wherein, the routing procedure is a shortest path routing procedure and the cost metric is determined by a ratio of the used link capacity and the demand size to the total link capacity.

20. The computer readable medium of claim 17 wherein, the routing procedure is a shortest-widest path routing procedure and the cost metric is associated with a percentage of link idle capacity.

21. The computer readable medium of claim 17 wherein, if there are multiple candidate paths, the path with minimum hops or the shortest distance is chosen.

22. The computer readable medium of claim 17 wherein, the routing procedure is a Min-Max link utilization routing procedure and the cost metric is associated with a maximum link utilization of the link, the demand size, and link utilization of the plurality of links.

23. The computer readable medium of claim 22 wherein, the cost metric is adjusted by a small scalar value and the demand size where a cost metric for a link is the same as a cost metric for another link.

24. The computer readable medium of claim 17 wherein, the routing procedure is a hybrid routing procedure and the cost metric is associated with the link utilization, the demand size, a maximum link utilization for the link, a number of hops of a minimum hop path for the demand, and the link utilization of the plurality of links.

25. The computer readable medium of claim 24 wherein, the selected path to route network traffic is the shortest path.

26. The computer readable medium of claim 17 wherein, the selecting of the path to route network traffic is based on a weight associated with the calculated cost metric for each of the plurality of links; each weight being manipulated in a open shortest path first network.

* * * * *